United States Patent
Anderson et al.

(10) Patent No.: US 7,426,235 B1
(45) Date of Patent: Sep. 16, 2008

(54) METHOD OF ADAPTIVE EQUALIZATION FOR HIGH-SPEED NRZ AND MULTI-LEVEL SIGNAL DATA COMMUNICATIONS

(75) Inventors: Stephen D. Anderson, Minnetonka, MN (US); David E. Tetzlaff, Minnetonka, MN (US); Michael J. Gaboury, Burnsville, MN (US); Matthew L. Bibee, Bloomington, MN (US)

(73) Assignee: Xilinx, Inc., San Jose, CA (US)

( * ) Notice: Subject to any disclaimer, the term of this patent is extended or adjusted under 35 U.S.C. 154(b) by 753 days.

(21) Appl. No.: 10/965,938

(22) Filed: Oct. 15, 2004

(51) Int. Cl.
*H04B 1/38* (2006.01)

(52) U.S. Cl. .................. 375/221; 375/229

(58) Field of Classification Search .......... 375/221
See application file for complete search history.

(56) References Cited

U.S. PATENT DOCUMENTS

| | | | | | |
|---|---|---|---|---|---|
| 3,813,598 | A | * | 5/1974 | Stuart | 375/371 |
| 4,959,845 | A | * | 9/1990 | Tol et al. | 375/354 |
| 5,138,569 | A | * | 8/1992 | Valenzuela | 708/312 |
| 5,253,249 | A | * | 10/1993 | Fitzgerald et al. | 370/276 |
| 5,392,348 | A | * | 2/1995 | Park et al. | 379/386 |
| 5,579,336 | A | * | 11/1996 | Fitzgerald et al. | 375/219 |
| 5,619,564 | A | * | 4/1997 | Canniff et al. | 379/386 |
| 5,995,557 | A | * | 11/1999 | Srinivasan | 375/316 |
| 6,006,108 | A | * | 12/1999 | Black et al. | 455/553.1 |
| 6,801,622 | B1 | * | 10/2004 | Jagadeesan | 379/386 |
| 6,928,495 | B2 | * | 8/2005 | LeBlanc et al. | 710/52 |
| 6,956,442 | B2 | * | 10/2005 | Groen et al. | 331/57 |
| 7,039,044 | B1 | * | 5/2006 | Whitfield et al. | 370/356 |
| 2004/0136453 | A1 | * | 7/2004 | Lin et al. | 375/232 |
| 2004/0215851 | A1 | * | 10/2004 | LeBlanc et al. | 710/52 |
| 2005/0111594 | A1 | * | 5/2005 | Varyzgin | 375/344 |
| 2005/0119025 | A1 | * | 6/2005 | Mohindra et al. | 455/552.1 |

OTHER PUBLICATIONS

U.S. Appl. No. 10/660,062, filed Sep. 11, 2003, Groen et al.
U.S. Appl. No. 10/660,448, filed Sep. 11, 2003, Groen et al.

* cited by examiner

*Primary Examiner*—David C. Payne
*Assistant Examiner*—Leon-Viet Q Nguyen
(74) *Attorney, Agent, or Firm*—James Harrison; Michael R. Hardaway

(57) ABSTRACT

Circuitry for equalizing a high data rate serial data stream that receives low frequency and high frequency test tones, accurately measures an amount of attenuation experienced by the high frequency test tone in relation to the low frequency test tone, and accordingly, produces equalization data that results in a corresponding amount of equalization or pre-emphasis being added to an outgoing signal. More specifically, however, the present invention includes both open loop and closed loop systems for equalizing or adding pre-emphasis to a signal with attenuation. In the open loop transceiver system, a presumption is made that an amount of attenuation in both the outgoing and ingoing directions are equal. In the closed loop transceiver system, a receiver determines an amount of equalization and produces the equalization data to a remote transceiver.

25 Claims, 10 Drawing Sheets

Figure 1 programmable logic device 10 programmable MGT 14 - 28 programmable MGT 14 - 28

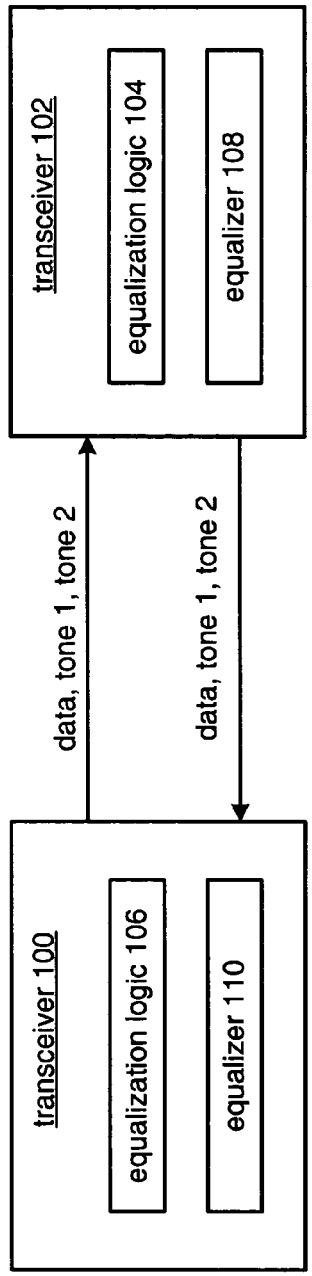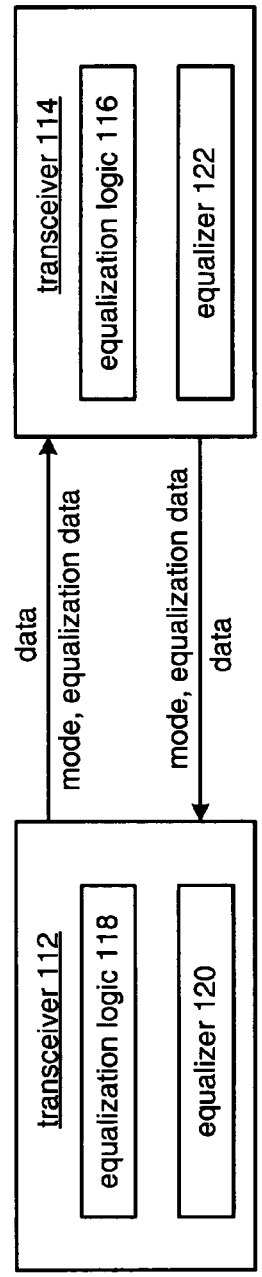
Figure 5  open loop transceiver equalization
Figure 6  closed loop transceiver equalization
Mode 1: Low Frequency Tone
Mode 2: High Frequency Tone

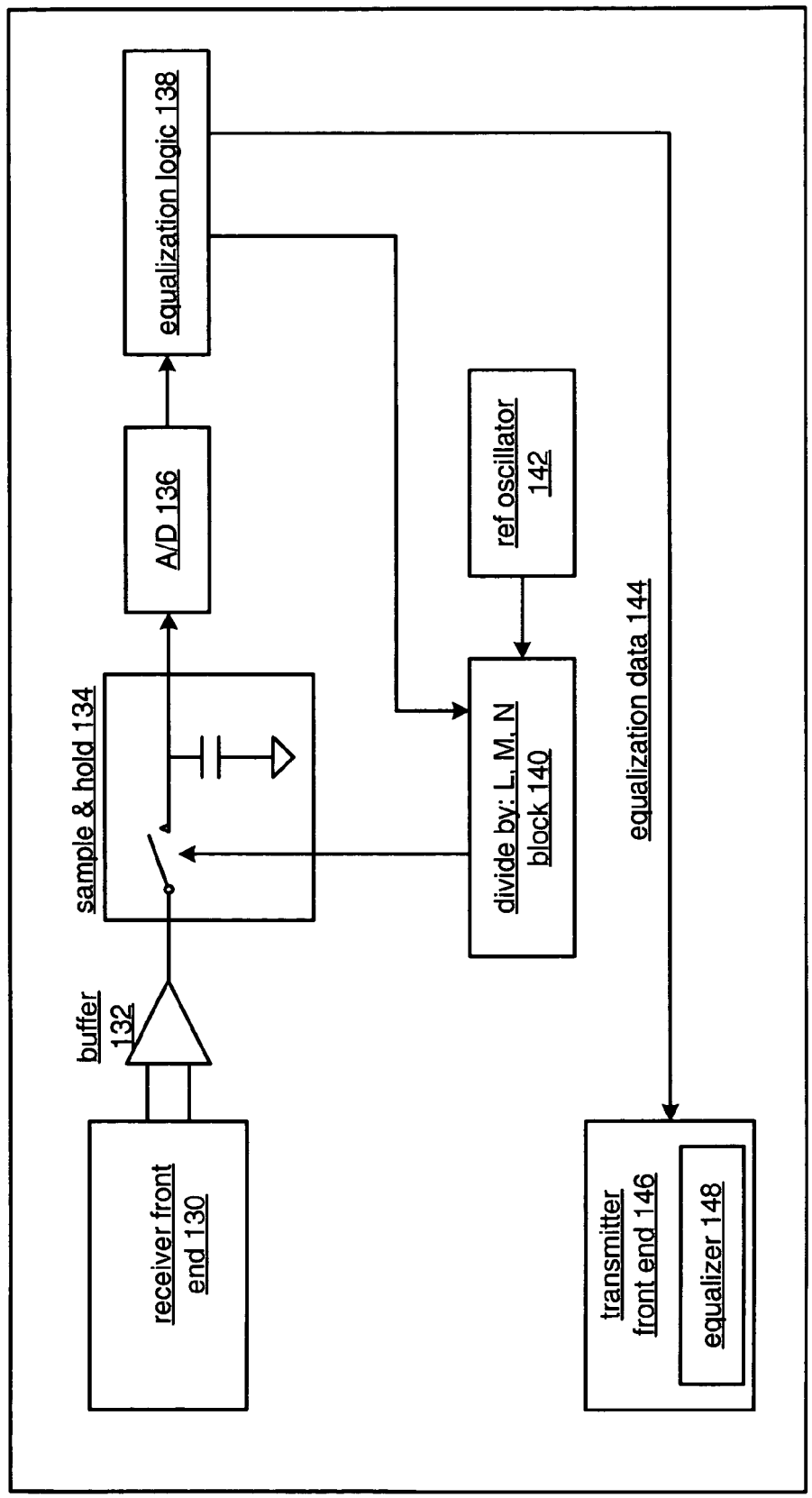
Figure 7 open loop transceiver 100 closed loop transceiver system 150

METHOD OF ADAPTIVE EQUALIZATION FOR HIGH-SPEED NRZ AND MULTI-LEVEL SIGNAL DATA COMMUNICATIONS

BACKGROUND OF THE INVENTION

1. Technical Field of the Invention

This invention relates generally to communication systems and more particularly to high data rate serial communications.

2. Description of Related Art

Communication systems are known to transport large amounts of data between a plurality of end user devices, which, for example, include telephones (i.e., land line and cellular), facsimile machines, computers, television sets, personal digital assistants, etc. As is known, such communication systems may be local area networks (LANs) and/or wide area networks (WANs) that are stand-alone communication systems or interconnected to other LANs and/or WANs as part of a public switched telephone network (PSTN), packet switched data network (PSDN), integrated service digital network (ISDN), or the Internet. As is further known, communication systems include a plurality of system equipment to facilitate the transporting of data. Such system equipment includes, but is not limited to, routers, switches, bridges, gateways, protocol converters, frame relays, and private branch exchanges.

The transportation of data within communication systems is governed by one or more standards that ensure the integrity of data conveyances and fairness of access for data conveyances. For example, there are a variety of Ethernet standards that govern serial transmissions within a communication system at data rates of 10 megabits per second, 100 megabits per second, 1 gigabit per second (Gbps) and beyond. Synchronous Optical NETwork (SONET), for example, currently provides for up to 10 Gbps. In accordance with such standards, many system components and end user devices of a communication system transport data via serial transmission paths. Internally, however, the system components and end user devices may process data in a parallel manner. As such, each system component and end user device must receive the serial data and convert the serial data into parallel data without loss of information. After processing the data, the parallel data must be converted back to serial data for transmission without loss of information.

Accurate recovery of information from high-speed serial transmissions typically requires transceiver components that operate at clock speeds equal to or higher than the received serial data rate. Higher clock speeds require oscillator circuits to have gain-bandwidth products to sustain high frequency oscillations while maintaining low phase noise. High phase noise contributes to clock jitter which degrades clock recovery in high-speed circuits. Higher clock speeds limit the usefulness of prior art clock recovery circuits that require precise alignment of signals to recover clock and/or data. Higher data rates require greater bandwidth for a feedback loop of the clock recovery circuits to operate correctly. Some prior art designs are bandwidth limited.

As the demand for data throughput increases, so do the demands on a high-speed serial transceiver. The increased throughput demands are pushing some current integrated circuit manufacturing processes to their operating limits. Integrated circuit processing limits (e.g., device parasitics, trace sizes, propagation delays, device sizes) and integrated circuit (IC) fabrication limits (e.g., IC layout, frequency response of the packaging, frequency response of bonding wires) limit the speed at which the high-speed serial transceiver may operate without excessive jitter performance and/or noise performance.

One solution for high-speed serial transceivers is to use an IC technology that inherently provides for greater speeds. For instance, switching from a Complementary Metal-Oxide Semiconductor (CMOS) process to a silicon germanium or gallium arsenide process would allow integrated circuit transceivers to operate at greater speeds, but at substantially increased manufacturing costs. CMOS is more cost effective and provides easier system integration. Currently, for most commercial-grade applications, including communication systems, such alternate integrated circuit fabrication processes are too cost prohibitive for widespread use.

Modern communication systems, including high data rate communication systems, typically include a plurality of circuit boards that communicate with each other by way of signal traces, bundled data lines, back planes, etc. Accordingly, designers of high data rate communication transceiver devices often have conflicting design goals that relate to the performance of the particular device. For example, there are many different communication protocols specified for data rates that range from 2.48832 Gbps for OC48, to 9.95 Gbps for OC192. Other known standards define data rates of 2.5 Gbps (INFINIBAND) or 3.125 Gbps (XAUI). For example, one protocol may specify a peak voltage range of 200-400 millivolts, while another standard specifies a mutually exclusive voltage range of 500-700 millivolts. Thus, a designer either cannot satisfy these mutually exclusive requirements (and therefore cannot support multiple protocols) or must design a high data rate transceiver device that can adapt according to the protocol being used for the communications.

Along these lines, field programmable gate array (FPGA) circuits are gaining in popularity for providing the required flexibility and adaptable performance, as described above, for those designers that seek to build one device that can operate according to multiple protocols. Thus, while FPGA technology affords a designer an opportunity to develop flexible and configurable hardware circuits, specific designs that achieve the desired operations must still be developed.

High data rate serial communications, whether produced or processed by FPGA circuits, or whether processed by traditional Application Specific Integrated Circuits (ASIC) or other types of communication devices, often experience signal distortion in the communication channel. Generally, higher frequency signals or data rates result in greater amounts of added distortion. One known distortion relates to introduced phase shifts in the serial data. Additionally, a square wave often experiences attenuation of higher frequency components of the square wave resulting in a signal that appears as a sine wave. Thus, for high data rate serial communications, the signal magnitude is often significantly attenuated thereby rendering the signal more difficult to properly interpret or detect. For these and other reasons, it is desirable to equalize the signal to improve the signal quality received by the receiver. While it is generally known that equalization of a signal improves signal quality at the receiver, the circuitry and method for determining how much equalization is required is not as definite. In some prior art designs, a standard amount of equalization is performed without consideration of actual channel conditions. For those circuits and methods that might attempt, however, to measure channel conditions or channel-induced distortion, it is required that accurate measurements of the received signal magnitude be obtained to determine how much equalization is to be performed or pre-emphasis is to be added. What is needed, therefore, is a system and method for accurately measuring and determining an amount of a signal magnitude for a received signal as a part of determining how much equalization is to be performed or pre-emphasis is to be added to a signal at the transmitter end.

Generally, equalization of frequency-dependent magnitude distortion is necessary for communication over copper cable or copper circuit board traces at gigabit data rates. The amount of equalization, however, is a function of cable and trace length. Communication channels quite often are found in pairs for carrying bi-directional non-return to zero (NRZ) data. The lengths of cable or circuit board traces are typically the same for a given pair. To determine an amount of transmit-based equalization (pre-emphasis) or receiver based equalization that is to be added, it is important to accurately determine the amount of distortion or signal degradation (attenuation) that occurs in the transmission channels. Accordingly, a system and method for accurately determining signal magnitude attenuation is necessary in order to determine a proper amount of transmit-based equalization.

Data communication schemes at rates in access of 1 Gbps tend to use very high frequencies, often in access of 1 GHz. Transmission lines made with copper cable or copper circuit board traces have a frequency response as magnitude drops with increasing frequency. If the signaling method or line code encompasses a broad range of frequencies, the lower frequency components are transmitted with no attenuation, while higher frequency components can be severely attenuated. This distortion, often known as inter symbol interference, makes the detection of the signal at the receiver difficult if not impossible. Generally, the amount of attenuation, at a given frequency, is a function of the length of the cable or circuit board trace.

Many forms of equalization exist for the purpose of correcting or partially correcting the signal distortion due to frequency-dependent losses. Each of the forms of equalization effectively remove or decrease the frequency-dependence by increasing the amplitude of the higher frequency components or decreasing the amplitude of the lower frequency components. This is done in a way such that the frequency response is an inverse of transmission line frequency response characteristics. A preferred equalization method often includes use of pre-emphasis.

Pre-emphasis involves boosting one or more of the higher frequency components in the transmitter. The amount of correction that is applied is a function of the transmission line length. Since the length is not usually known, however, it is helpful to make the equalization adaptive. Accordingly, the transmitter is required to determine, to optimize the amount of pre-emphasis that is added, how much attenuation exists for higher frequency components and thus how much pre-emphasis to apply. Accordingly, what is needed is a system and method that accurately measures signal magnitudes as a part of determining how much equalization is to be performed or how much pre-emphasis is to be added to a signal at a transmitter end. Moreover, what is needed is a system and method for adaptively adding equalization or pre-emphasis based upon circuits in which line or trace links are approximately equal in the transmit and receive directions and in circuits where the transmit and receive line or trace links are unequal, thereby requiring differing amounts of equalization.

BRIEF SUMMARY OF THE INVENTION

A method and apparatus of the present invention provide for circuitry that receives low frequency and high frequency test tones, accurately measures an amount of attenuation experienced by the high frequency test tone in relation to the low frequency test tone and, accordingly, produces equalization data that results in a corresponding amount of pre-emphasis being added to an outgoing signal. More specifically, however, embodiments of the present invention have both open loop and closed loop systems for equalizing or adding pre-emphasis to a signal with attenuation.

In the open loop transceiver system, a presumption is made that an amount of attenuation in both the outgoing and ingoing directions are equal (i.e., in the transmit and receive directions). Accordingly, a receiver adjusts its outgoing data with equalization or pre-emphasis based upon an amount of attenuation for an ingoing signal. In a closed loop transceiver system, however, in which the transmit and receive interference is not presumed to be the same, a receiver determines an amount of equalization or pre-emphasis that should be added to a signal and produces the equalization data to a remote transceiver specifying an amount of equalization or pre-emphasis that should be added to prompt the remote transceiver to add the specified amount of equalization or pre-emphasis to its outgoing signal.

In order to accurately determine an amount of pre-emphasis that is to be added to a signal, a receiver detects a peak amplitude of a low frequency tone and then detects a peak amplitude of a high frequency tone to determine an amount of attenuation experienced through the transmission path. One problem, however, is to accurately sample the received high frequency tone to detect a peak value. Accordingly, equalization logic within the receiver prompts the receiver to sample the received high frequency tone at a plurality of sample rates to improve a likelihood that a peak value of the high frequency tone is detected. With two or more sample rates, it is certain that at least one of the two sample rates will not be coherent with the receive clock thereby avoiding the situation in which a coherent sample rate does not detect a peak value. Accordingly, the highest detected peak value of the high frequency tones sampled at the plurality of sample rates is compared to a presumably accurate signal magnitude for the low frequency tone. This enables equalization logic within the receiver to determine an accurate amount of attenuation for the received high frequency signal in the receive path so as to result in the transmitters of the present invention providing an accurate amount of equalization or to add an accurate amount of pre-emphasis to an outgoing signal.

More specifically, a receiver receives a low frequency tone from a transmitter to enable the receiver to determine a first signal level with little to no attenuation. Thereafter, the receiver determines a highest signal magnitude value for x samples of the low frequency tone. Subsequently, the receiver receives a high frequency tone and determines a highest signal magnitude value for y and z samples of the high frequency tone. Based upon a difference between the signal magnitude of the low frequency tone and the highest detected signal magnitude for the high frequency tone as determined from taking the y and z samples (at differing sample rates), one embodiment of the invention includes adding pre-emphasis to equalize an outgoing transmit signal if the difference is not within tolerance.

After adding the pre-emphasis or after equalizing the signal, an embodiment of the invention includes determining a highest signal magnitude value for y and z samples of the high frequency tone with (additional) pre-emphasis signal.

The step of determining attenuation more specifically includes calculating a ratio between the signal magnitudes for the high and low frequency tones. This includes transmitting a request to the transmitter for the transmitter to generate a first tone (a low frequency tone), sampling the first tone x times at a first specified sample rate, determining, for each sample, if the sampled signal has a higher signal magnitude than a previously stored signal magnitude and, if so, storing the signal magnitude value After x samples, the highest stored signal magnitude is the highest low frequency signal magnitude.

Thereafter this embodiment of the invention includes transmitting a request to the transmitter for the transmitter to generate a second tone (high frequency tone). Thereafter, this embodiment of the invention includes sampling the second tone y times at a second specified sample rate and, for each sample, determining if the sampled signal has a higher signal magnitude than a previously stored signal magnitude and, if so, storing the signal magnitude value. Thus, this embodiment of the invention includes storing the highest signal magnitude value after y samples to indicate a first high frequency signal magnitude wherein the second tone comprises a frequency that is approximately equal to or greater than one half of a specified bit rate of a high bit rate serial data stream.

The invention further includes, in the described embodiment, sampling the second tone z times at a specified third sample rate and for each sample, determining if the sampled signal has a higher signal magnitude than a previously stored signal magnitude and, if so, storing the signal magnitude value. After the z samples, this embodiment of the invention includes storing the highest signal magnitude value to indicate a second high frequency signal magnitude. After the above described samples are taken, this embodiment of the invention includes calculating a ratio of the highest magnitude low frequency measurement to the highest magnitude high frequency measurement.

Finally, this embodiment of the invention includes generating a high frequency tone with pre-emphasis based upon a value of the calculated ratio if the ratio exceeds a specified value. In an open loop system, a transceiver equalizes or adds pre-emphasis to its own outgoing data based upon a detected amount of attenuation for ingoing data. In a closed loop system, a receiver produces equalization data to a remote transmitter or transceiver to prompt the remote transmitter/transceiver to add a specified amount of pre-emphasis for its outgoing data. Especially in the closed loop system, the process may be repeated until an amount of experienced attenuation, as measured herein, is within a specified tolerance. Because the ratio described herein is described as the low frequency measurement device being divided by the high frequency measurement (having attenuation), the ratio will be greater than or equal to one. If the ratio was calculated oppositely, then the threshold value would be less than or equal to one and the pre-emphasis is added whenever the ratio is less than a specified threshold. Finally, the invention applies to NRZ communications as well as multi-level signaling systems as are understood by those of average skill in the art.

BRIEF DESCRIPTION OF THE DRAWINGS

FIG. 5 is a functional block diagram of a system and method for open loop transceiver equalization;

FIG. 6 illustrates a method and apparatus for closed looped transceiver equalization according to one embodiment of the present invention;

FIG. 7 is a functional block diagram of an open loop transceiver formed according to one embodiment of the present invention;

DETAILED DESCRIPTION OF THE INVENTION

Figure 1:
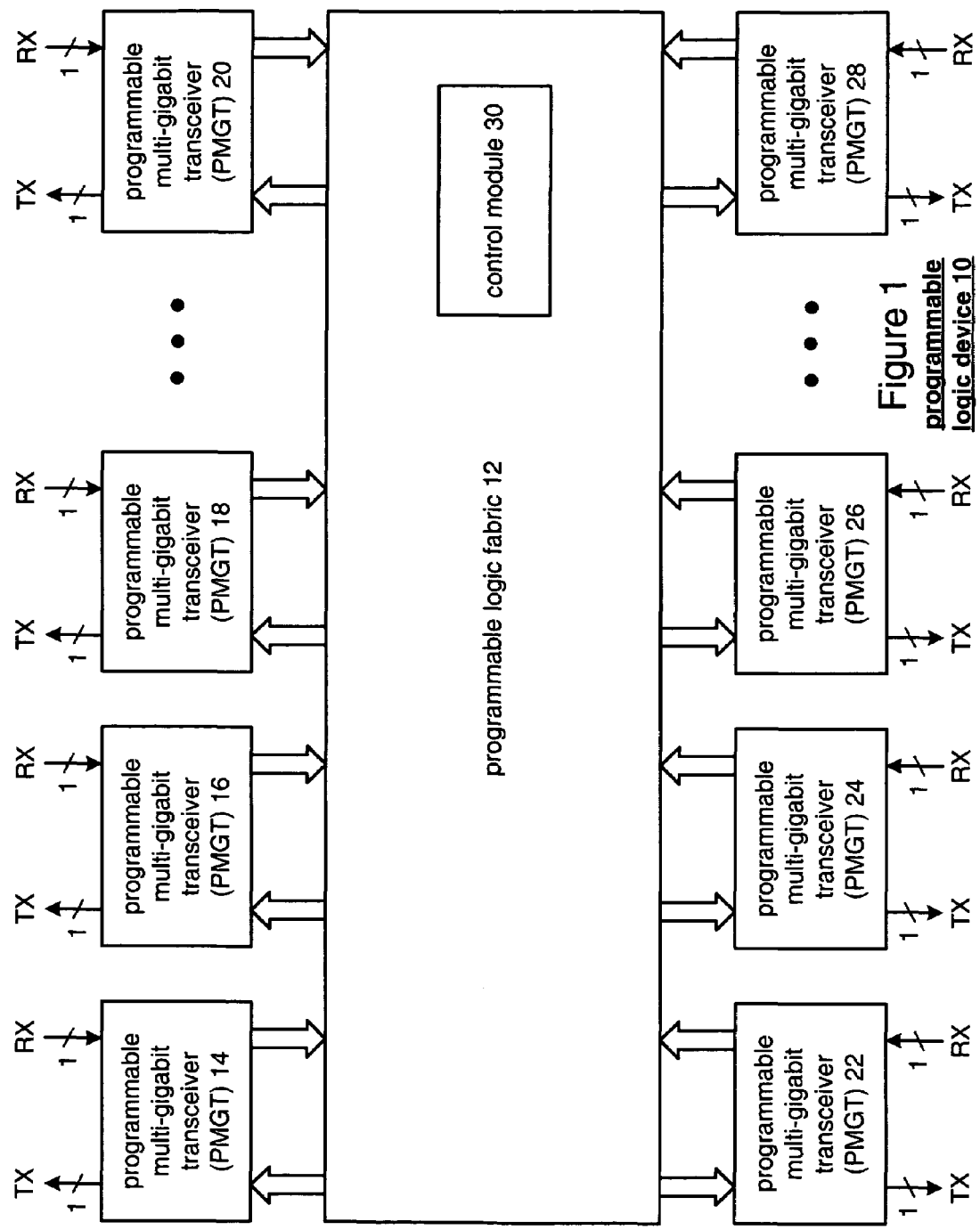
FIG. 1 is a schematic block diagram of a programmable logic device that includes programmable logic fabric, a plurality of programmable multi-gigabit transceivers (PMGTs), and a control module.

FIG. 1 is a schematic block diagram of a programmable logic device 10 that includes programmable logic fabric 12, a plurality of programmable multi-gigabit transceivers (PMGTs) 14-28 and a control module 30. The programmable logic device 10 may be a programmable logic array device, a programmable array logic device, an erasable programmable logic device, and/or a field programmable gate array (FPGA). When the programmable logic device 10 comprises an FPGA, the programmable logic fabric 12 may be implemented as a symmetric array configuration, a row-based configuration, a sea-of-gates configuration, and/or a hierarchical programmable logic device configuration. The programmable logic fabric 12 may further include at least one dedicated fixed processor, such as a microprocessor core, to further facilitate the programmable flexibility offered by programmable logic device 10.

The control module 30 may be contained within the programmable logic fabric 12 or it may be a separate module. In either implementation, control module 30 generates control signals to program transmit and receive sections of each of the PMGTs 14-28. In general, each of the PMGTs 14-28 performs a serial-to-parallel conversion on receive data and performs a parallel-to-serial conversion on transmit data. The parallel data may be, for instance, 8-bits wide, 16-bits wide, 32-bits wide, or 64-bits wide.

Typically, the serial data will be a 1-bit stream of data that may be a binary level signal, a multi-level signal, etc. Further, two or more programmable multi-gigabit transceivers may be bonded together to provide greater transmitting speeds. For example, if PMGTs 14, 16 and 18 are transceiving data at 3.125 Gbps, the PMGTs 14, 16 and 18 may be bonded together such that the effective serial data rate is approximately 3 times 3.125 Gbps.

Each of the programmable multi-gigabit transceivers 14-28 may be individually programmed to conform to separate standards. In addition, the transmit path and receive path of each programmable multi-gigabit transceiver 14-28 may be separately programmed such that the transmit path of a transceiver is supporting one standard while the receive path of the same transceiver is supporting a different standard. Further, the serial data rates of the transmit path and receive path may be programmed, for example, from 1 gigabit per second to tens of gigabits per second. The size of the parallel data in the transmit and receive sections, or paths, is also programmable and may vary, for instance, from 8-bits, 16-bits, 32-bits, or 64-bits.

Figure 2:
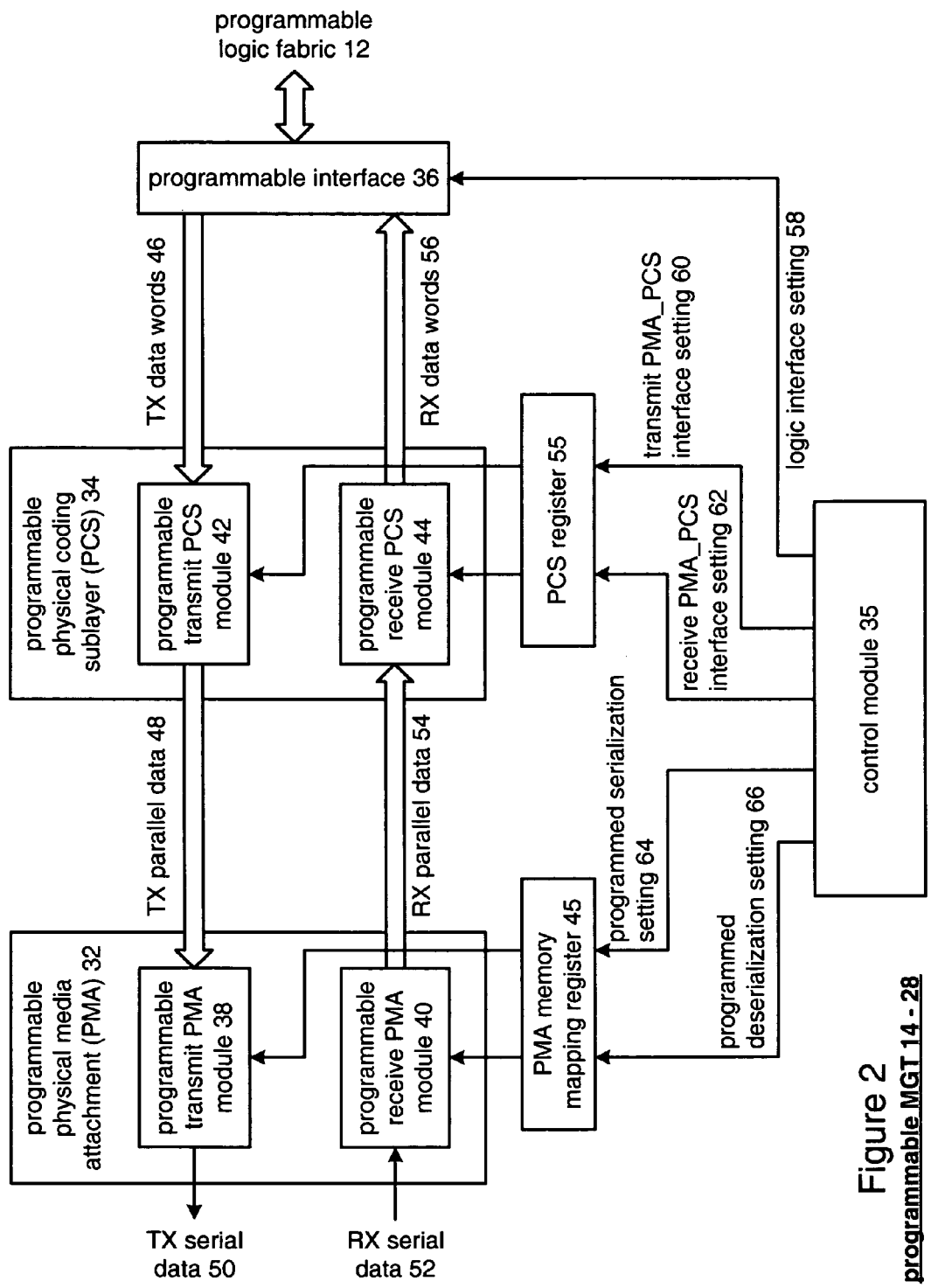
FIG. 2 is a schematic block diagram of one embodiment of a representative one of the programmable multi-gigabit transceivers.

FIG. 2 is a schematic block diagram of one embodiment of a representative one of the programmable multi-gigabit transceivers 14-28. As shown, the programmable multi-gigabit transceiver 14-28 includes a programmable physical media attachment (PMA) module 32, a programmable physical coding sub-layer (PCS) module 34, a programmable interface 36, a control module 35, a PMA memory mapping register 45 and a PCS register 55. The control module 35, based on the desired mode of operation for the individual programmable multi-gigabit transceiver 14-28, generates a programmed deserialization setting 66, a programmed serialization setting 64, a receive PMA_PCS interface setting 62, a transmit PMA_PCS interface setting 60, and a logic interface setting 58. The control module 35 may be a separate device within each of the programmable multi-gigabit transceivers or included partially or entirely within the control module 30 of FIG. 1.

In either embodiment of the control module 35, the programmable logic device control module 30 determines the corresponding overall desired operating conditions for the programmable logic device 10 and provides the corresponding operating parameters for a given programmable multi-gigabit transceiver to its control module 35, which generates the settings 58-66.

The programmable PMA module 32 includes a programmable transmit PMA module 38 and a programmable receive PMA module 40. The programmable transmit PMA module 38 is operably coupled to convert transmit parallel data 48 into transmit serial data 50 in accordance with the programmed serialization setting 64. The programmed serialization setting 64 indicates the desired rate of the transmit serial data 50, the desired rate of the transmit parallel data 48, and the data width of the transmit parallel data 48. The programmable receive PMA module 40 is operably coupled to convert receive serial data 52 into receive parallel data 54 based on the programmed deserialization setting 66. The programmed deserialization setting 66 indicates the rate of the receive serial data 52, the desired rate of the receive parallel data 54, and the data width of the receive parallel data 54. The PMA memory mapping register 45 may store the programmed serialization setting 64 and the programmed deserialization setting 66.

The programmable PCS module 34 includes a programmable transmit PCS module 42 and a programmable receive PCS module 44. The programmable transmit PCS module 42 receives transmit data words 46 from the programmable logic fabric 12 via the programmable interface 36 and converts them into the transmit parallel data 48 in accordance with the transmit PMA_PCS interface setting 60. The transmit PMA_PCS interface setting 60 indicates the rate of the transmit data words 46, the size of the transmit data words (e.g., one byte, two bytes, three bytes, four bytes) and the corresponding transmission rate of the transmit parallel data 48. The programmable receive PCS module 44 converts the receive parallel data 54 into receive data words 56 in accordance with the receive PMA_PCS interface setting 62. The receive PMA_PCS interface setting 62 indicates the rate at which the receive parallel data 54 will be received, the width of the receive parallel data 54, the transmit rate of the receive data words 56 and the word size of the receive data words 56.

The control module 35 also generates the logic interface setting 58 that provides the rates at which the transmit data words 46 and receive data words 56 will be transceived with the programmable logic fabric 12. Note that the transmit data words 46 may be received from the programmable logic fabric 12 at a different rate than the receive data words 56 are provided to the programmable logic fabric 12.

As one of average skill in the art will appreciate, each of the modules within the programmable PMA module 32 and programmable PCS module 34 may be individually programmed to support a desired data transfer rate. The data transfer rate may be in accordance with a particular standard such that the receive path, i.e., the path through programmable receive PMA module 40 and the programmable receive PCS module 44, may be programmed in accordance with one standard, while the transmit path, i.e., the path through the programmable transmit PCS module 42 and the programmable transmit PMA module 38, may be programmed in accordance with the same or another standard.

Because the data transfer rate may be varied in accordance with the particular standard or for a particular device having specified data transfer rate capabilities, the amount of transmit equalization that is to be performed to a transmit signal varies. Thus, as will be described in greater detail below, the invention includes an adaptive method and circuit for adjusting an amount of transmit equalization that is to be performed (amount of pre-emphasis that is to be added) to a transmit signal. Generally, the circuit and method provide for determining an amount of attenuation that occurs in a specified transmit channel and adding an amount of pre-emphasis that is based upon the determined amount of attenuation.

Figure 3:
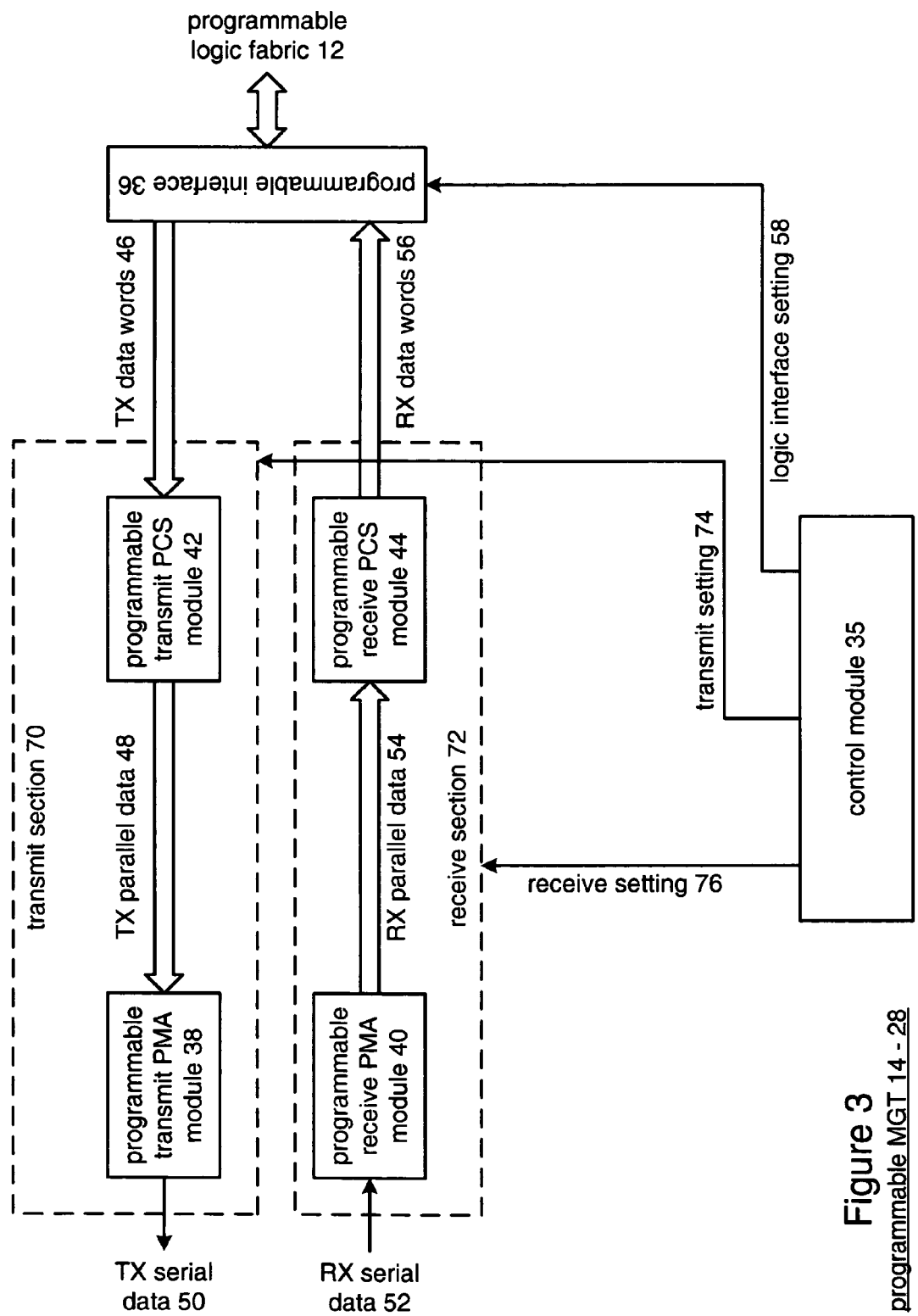
FIG. 3 illustrates an alternate schematic block diagram of a representative one of the programmable multi-gigabit transceivers.

FIG. 3 illustrates an alternate schematic block diagram of a representative one of the PMGTs 14-28. In this embodiment, the PMGTs 14-28 include a transmit section 70, a receive section 72, the control module 35 and the programmable interface 36. The transmit section 70 includes the programmable transmit PMA module 38 and the programmable transmit PCS module 42. The receive section 72 includes the programmable receive PMA module 40 and the programmable receive PCS module 44.

In this embodiment, the control module 35 separately programs the transmit section 70 and the receive section 72 via transmit setting 74 and receive setting 76, respectively. The control module 35 also programs the programmable interface 36 via the logic interface setting 58. Accordingly, the control module 35 may program the receive section 72 to function in accordance with one standard while programming the transmit section 70 in accordance with the same or another standard. Further, the logic interface setting 58 may indicate that the transmit data words 46 are received from the programmable logic fabric 12 at a different rate than the receive data words 56 are provided to the programmable logic fabric 12. As one of average skill in the art will appreciate, the programmable interface 36 may include a transmit buffer and a receive buffer, and/or an elastic store buffer to facilitate the providing and receiving of transmit data words 46 and receive data words 56 to and from the programmable logic fabric 12.

Figure 4:
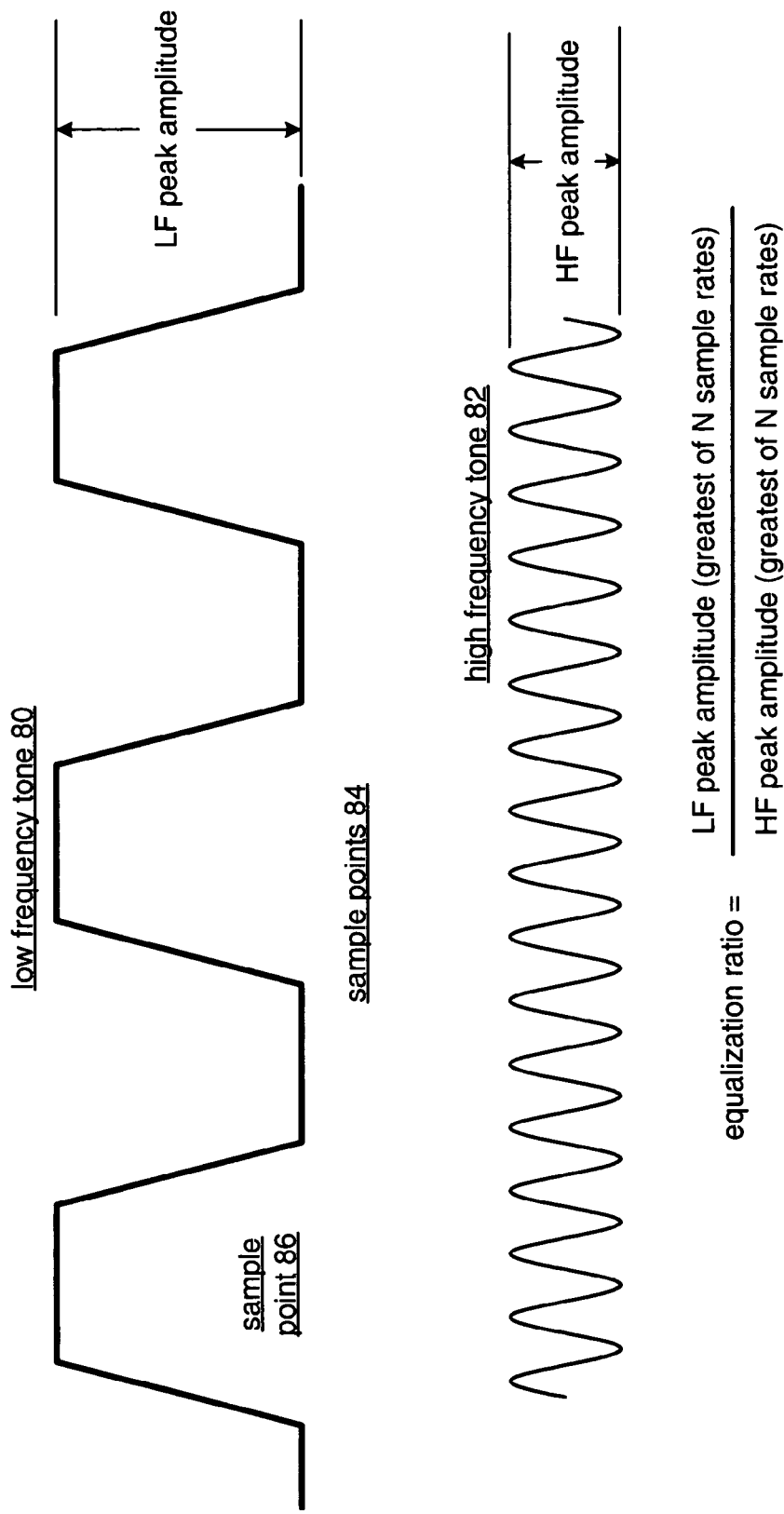
FIG. 4 is a signal diagram that illustrates channel response for a high frequency tone in relation to channel response for a low frequency square wave tone and that further illustrates the determination of an equalization ratio according to one embodiment of the present invention.

FIG. 4 is a signal diagram that illustrates channel response for a high frequency tone in relation to channel response for a low frequency square wave tone and that further illustrates the determination of an equalization ratio according to one embodiment of the present invention. Generally, two wave forms 80 and 82 each reflect a received wave form for a square wave that is transmitted at a low frequency and then at a high frequency. Low frequency square wave tone 80 is shown in FIG. 4 having a low frequency peak amplitude. The rise and fall time of the low frequency tone are exaggerated merely as a reminder that the square wave is not perfect and does not have instantaneous rise or fall times. Additionally, high frequency tone 82 is shown having a high frequency peak amplitude. It is presumed that the high frequency tone that is shown is at the receiver and originally represented a high frequency square wave tone similar in magnitude and form to the low frequency square wave tone 80 shown in FIG. 4.

As may be seen, the peak amplitude of the high frequency tone 82 is significantly attenuated in relation to the low frequency tone 80 peak amplitude. Assuming that the high frequency tone 82 was transmitted with an amplitude that was equal to the low frequency tone 80 amplitude, one may note that the high frequency peak amplitude is significantly attenuated in relation to the low frequency peak amplitude. As is further shown in FIG. 4, an equalization ratio may be calculated by dividing the low frequency peak amplitude value by the high frequency peak amplitude value. Measuring the low frequency and high frequency peak amplitudes, however, is an important part of accurately determining a proper equalization ratio.

As will be described in greater detail below, an embodiment of the invention includes taking a plurality of samples of the low frequency tone 80 and the high frequency tone 82, at the receiver, to properly determine the low frequency and high frequency peak amplitudes. Because the equalization ratio includes the low frequency peak amplitude value being divided by the high frequency peak amplitude value, it follows that the equalization ratio will be greater than 1 because the low frequency tone has a higher magnitude than the high frequency tone.

FIG. 4 further illustrates one reason why it is difficult and not necessarily guaranteed that the low frequency and high frequency peak amplitudes may accurately be determined. FIG. 4, and more particularly low frequency tone 80 as received by a receiver, high frequency tone 82 as received by a receiver for a transmitted signal having a transmit signal magnitude equal to a transmit signal magnitude of the low frequency tone, and a plurality of sample points shown generally at 84 illustrate a problem to which at least one embodiment of the present invention is directed. As may be seen, for any given sample point of the sample points shown at 84, an instantaneous value of the low frequency and high frequency may be detected. For the low frequency tone 80, a plurality of sample points 84 accurately measures the peak amplitude. For the high frequency tone 82, however, only one of the sample points 86 almost accurately samples at the high frequency peak amplitude. Accordingly, an embodiment of the invention herein includes circuitry and a method for maximizing the likelihood that a peak amplitude is detected not only for the low frequency tone 80, but also for the high frequency tone 82. Generally, it is understood that the Nyquist theorem provides that a minimal sample rate should be twice the highest frequency component of a given signal. But as is shown in FIG. 4, the high frequency tone peak amplitude is not guaranteed to be detected even with a sample rate that is twice the frequency rate of the high frequency tone partially because a single sample rate may be coherent with a receive clock thus resulting in a peak never being detected unless the coherent sample rate is aligned through sheer good luck with a peak of the received signal.

FIG. 5 is a functional block diagram of a system and method for open loop transceiver equalization. As may be seen, a transceiver 100 is coupled to communicate with a transceiver 102. Transceiver 100 generates one of a data signal, tone 1 or tone 2, which is received by transceiver 102. Transceiver 102 comprises equalization logic 104 and an equalizer 108. Equalization logic 104 analyzes tone 1 and tone 2 as generated by transceiver 100 to determine an amount of transmit equalization that is to be performed for outgoing data by equalizer 108. In the embodiment of FIG. 5, it is presumed that the transmit and receive paths are of equal length and experience similar distortion. Similarly, transceiver 100 includes equalization logic 106 and an equalizer 110. Equalization logic 106 analyzes tone 1 and tone 2 as generated by transceiver 102 to determine an amount of transmit equalization that is to be performed upon outgoing data to transceiver 102. For one embodiment, this step involves determining how much pre-emphasis to add based upon a calculated ratio of the magnitudes of received low and high frequency signals.

Equalization logic 104 and equalization logic 106 both measure, as is described in greater detail below, a low frequency peak amplitude of tone 1 and a high frequency peak amplitude of tone 2 to determine the equalization ratio. The equalization ratio is then used to determine how much pre-emphasis is to be added by equalizer 108. Similarly, equalization logic 106 determines a peak amplitude for a low frequency tone 1 and a high frequency tone 2 to calculate an equalization ratio as a part of determining how much pre-emphasis is to be added or transmit equalization is to be performed by equalizer 110 for data transmitted to transceiver 102. In general, equalization logic 104 and equalization logic 106 will sample tone 1 and tone 2 with a plurality of sample rates to maximize the likelihood that a peak amplitude is detected for both the low frequency tone 1 and high frequency tone 2. The low frequency tone 1 and high frequency tone 2 generated by transceivers 100 and 102, in the described embodiment of the invention, are similar in frequency and signal magnitude.

In operation, as mentioned before, FIG. 5 illustrates one embodiment of the invention in which the transceiver devices perform open loop transceiver equalization. Because it is assumed that path lengths (e.g., trace lengths) are similar, the signal distortion is presumed to be the same in both the transmit and receive directions. Thus, each transceiver 100 or transceiver 102 will add an amount of transmit equalization that is based upon a difference in signal magnitudes between the high and low frequency tones received from the other of transceivers 100 and 102. If an assumption that the signal distortion is the same in both directions, then the transmit equalization by each of the transceivers 100 and 102 should be similar as the amounts of attenuation of the high frequency tone 2 are the same in both directions.

FIG. 6 illustrates a method and apparatus for closed loop transceiver equalization according to one embodiment of the present invention. A transceiver 112 is coupled to communicate with a transceiver 114 produce equalization data to a transceiver 114 and vice-versa. Transceiver 112 includes equalization logic 118 and an equalizer 120, while transceiver 114 includes equalization logic 116 and an equalizer 122. Equalization logic 118 and 116 determine an amount of equalization that is necessary or an amount of pre-emphasis that is to be added, while equalizers 120 and 122 perform the amount of equalization requested by the other transceiver (for equalizer 122, the amount requested by transceiver 112 and, for equalizer 120, the amount of equalization requested by transceiver 114). Each of the transceivers 112 and 114 produces mode control commands, as well as data and equalization data to the other transceiver. The mode data includes a request specifying one of a plurality of tones.

Thus, for example, mode one could reflect a low frequency tone and mode 2 could reflect a high frequency tone. Accordingly, if transceiver 112, for example, produces a mode 1 request to transceiver 114, transceiver 114 will generate equalization data at a low frequency to enable transceiver 112 to measure a signal magnitude of the received low frequency tone that was transmitted in response to the mode command. Thereafter, transceiver 112 generates a mode command for a high frequency tone to prompt transceiver 114 to generate a high frequency tone, which is sampled by transceiver 112 to determine a peak value. In the described embodiment of the invention, transceiver 112 will sample the high frequency tones at a plurality of differing sample rates to maximize a probability of detecting a peak value of the high frequency tone. Accordingly, an amount of equalization or pre-emphasis that is to be added may be more accurately determined.

Similarly, for the closed loop transceiver equalization method and apparatus illustrated in FIG. 6, transceiver 114 also produces mode commands and requests for equalization data at low and high frequency tones so that the equalization logic there within may accurately determine an amount of equalization that is needed. In the described embodiment of FIG. 6, equalization logic 118 within transceiver 112 and equalization logic 116 within transceiver 114 further produce results of analysis performed by equalization logic 118 or 116 to request a specified amount of equalization or pre-emphasis based on the results determined by the corresponding equalization logic.

The embodiment of FIG. 6 is particularly beneficial for a circuit in which the transmit and receive signal paths are of different lengths and probably experience differing amounts of interference or attenuation thereby requiring differing amounts of equalization or pre-emphasis.

FIG. 7 is a functional block diagram of an open loop transceiver 100 formed according to one embodiment of the present invention. Open loop transceiver 100 includes a receiver front end 130 for receiving and amplifying an RF signal transmitted over a wireless medium. Receiver front end 130 produces an amplified analog signal at a specified frequency to a buffer 132. In the described embodiment of the invention, the analog signal produced by receiver front end 130 to buffer 132 is not down-converted and merely reflects the received frequency of the analog signal. Buffer 132 then buffers the received analog signal and produces a received analog and buffered signal to a sample and hold block 134. Sample and hold block 134 and samples and holds the buffered signal produced by buffer 132 based on a received sample control signal. A sampled value is then produced to an analog-to-digital converter 136 that, in turn, produces a digital sample to equalization logic 138. Equalization logic 138 then produces divide control signals to a divide block 140 which is formed to divide by a plurality of frequencies. In the described example, divide block 140 is formed to provide the sample control signals to sample and hold block 134 at a specified frequency that is based upon a received oscillation produced by a reference oscillator 142 and divided by a value L, M, or N. Whether the divide block 140 divides by L, M, or N is based upon the divide control signals received from equalization logic 138. Equalization logic 138 includes logic to sample low and high frequency tones at a plurality of sample rates to improve a likelihood that a peak value is detected.

Equalization logic 138 further includes logic to determine an amount of attenuation that a high frequency tone experiences in relation to a low frequency tone. Equalization logic 138 then determines an appropriate amount of equalization or pre-emphasis based upon the detected amount of attenuation. Equalization logic 138 then produces equalization data 144 to a transmitter front end 146, and more particularly, to an equalizer 148 within transmitter front end 146, to prompt equalizer 148 to generate a corresponding amount of equalization or pre-emphasis.

The open loop transceiver 100 is one that may be used in a circumstance in which the amount of interference in a transmit and receive path are believed to be equal. Accordingly, the open loop transceiver 100 equalizes an outgoing analog signal based upon an amount of detected interference, distortion, or attenuation in a received signal.

Figure 8:
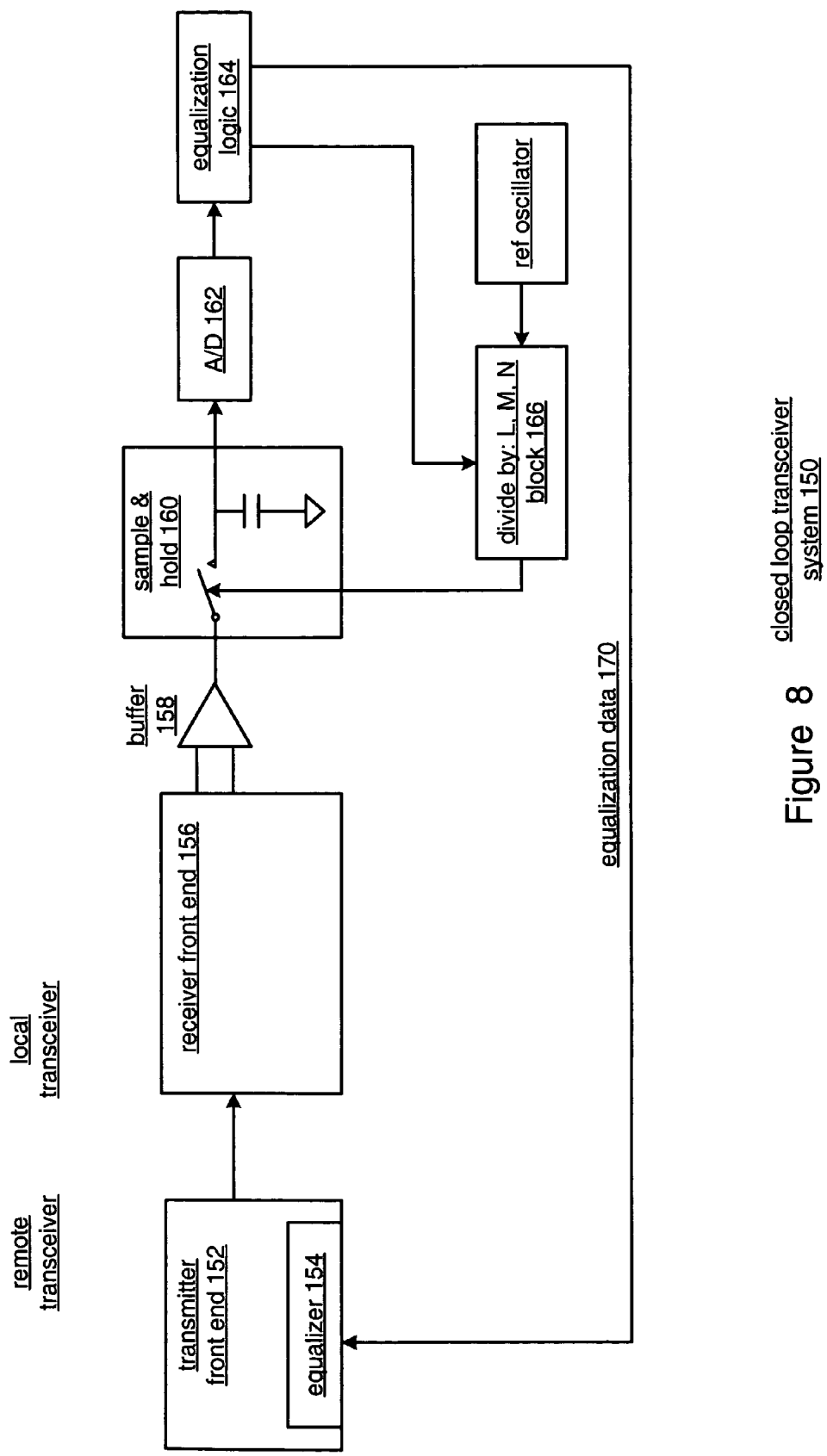
FIG. 8 is a functional block diagram of a closed loop transceiver system formed according to one embodiment of the present invention.

FIG. 8 is a functional block diagram of a closed loop transceiver system 150 formed according to one embodiment of the present invention. The closed loop transceiver system 150 includes a transmitter front end 152 of a remote transceiver, which transmitter front end 152 includes an equalizer 154. Transceiver system 150 further includes a local transceiver having a receiver front end 156 of a radio transceiver that receives high data rate digital signals produced by transmitter front end 152 of the remote transceiver.

Receiver front end 156 receives the high data rate serial data and produces the high data rate serial data to a buffer 158 which produces the high data rate serial data to a sample and hold block 160. The circuitry and operation of the components of a local radio transceiver of the closed loop transceiver system 150, for example, A/D converter block 162, equalization logic 164 and divide block 166, is similar to that described for the closed loop transceiver equalization apparatus and method described in relation to FIG. 6. Thus, equalization logic 164 produces equalization data 170 that is based upon a detected amount of attenuation in the high frequency high data rate serial data in relation to a low frequency low data rate serial data.

While not shown explicitly, it is understood that equalization data 170 is produced to a transmitter front end that transmits the equalization data to the remote radio transceiver and, more particularly, to the equalizer 154 of the remote radio transceiver. For the given example, in contrast to FIG. 6, the local radio transceiver represents transceiver 114 of FIG. 6, while the remote radio transceiver of FIG. 8 may be represented by transceiver 112 of FIG. 6.

Moreover, in reference again to FIG. 4, it may be seen that a received low frequency tone may appear as a square wave, but that a received high frequency tone appears as a sine wave of attenuation of higher frequency components. Thus, not only is the peak amplitude of the high frequency tone reduced, but also the form of the signal wherein a square wave signal has effectively transformed into a sine wave due to loss of higher frequency components of a signal that are required to produce a square wave.

Figure 9:
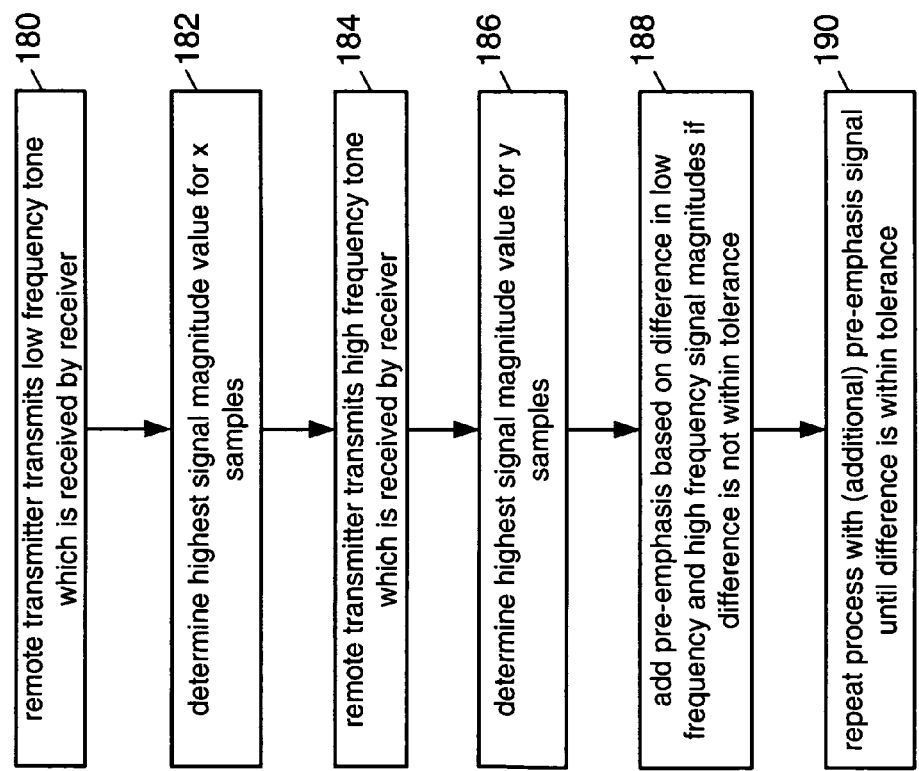
FIG. 9 is a flowchart illustrating a method for compensating for attenuation in a high data rate serial data stream according to one embodiment of the present invention.

FIG. 9 is a flowchart illustrating a method for compensating for attenuation in a high data rate serial data stream according to one embodiment of the present invention. A remote transmitter transmits low frequency tone, which is received by a receiver (step 180). The receiver, and more specifically an equalization logic within the receiver, determines a highest signal magnitude value as determined over x samples of the low frequency tone (step 182). The remote transmitter also transmits a high frequency tone, which is received by a receiver (step 184). The receiver (equalization logic within the receiver) then determines a highest signal magnitude value as determined over y samples of the high frequency tone (step 186).

The receiver then generates equalization data specifying how much equalization is to be performed for an outgoing high data rate serial data stream or how much pre-emphasis is to be added based on the difference in low frequency and high frequency signal magnitudes, if the difference is not within tolerance. A transmitter then performs a corresponding amount of equalization or adds a corresponding amount of pre-emphasis to outgoing high data rate serial data (step 188).

The transmitter may either be a part of a transceiver that includes the receiver and equalization logic that performs the above described steps in an open loop system or may be a remote transmitter that receives the equalization data in a closed loop system. Finally the process is repeated with (additional) pre-emphasis signal until difference is within tolerance if necessary (step 190).

Figure 10:
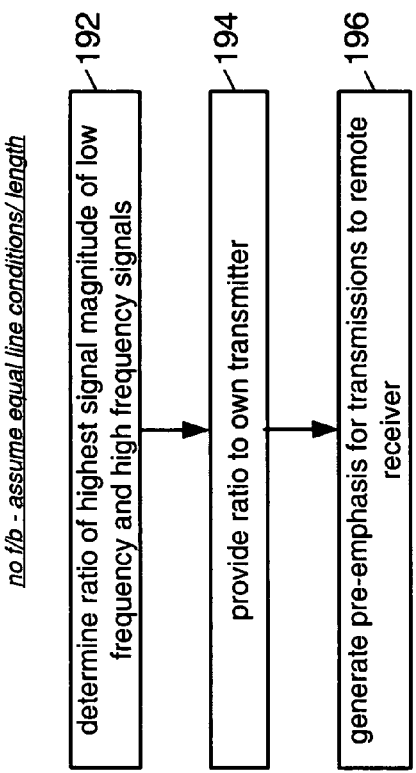
FIG. 10 is a flowchart that illustrates open loop equalization according to one embodiment of the present invention.

FIG. 10 is a flowchart that illustrates open loop equalization according to one embodiment of the present invention. Initially, a receiver determines a ratio of highest signal magnitude of low frequency and high frequency signals in any of the manners described herein (step 192). Thereafter, the receiver provides equalization data to its own transmitter (step 194). In the described embodiment, the equalization data comprises a ratio of a low frequency magnitude to a high frequency magnitude. The receiver's own transmitter then generates pre-emphasis for transmission to a remote receiver (step 196).

Figure 11:
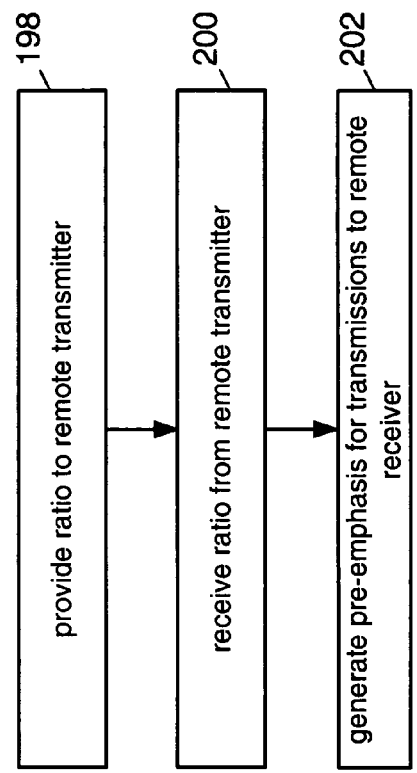
FIG. 11 is a flowchart that illustrates open loop equalization according to one embodiment of the present invention.

FIG. 11 is a flowchart that illustrates open loop equalization according to one embodiment of the present invention. Initially, a receiver determines a ratio of highest signal magnitude of low frequency and high frequency signals in any of the manners described herein. Thereafter, the receiver provides equalization data to a remote transmitter (step 198). In the described embodiment, the equalization data comprises a ratio of a low frequency magnitude to a high frequency magnitude. The receiver further receives a ratio (or equalization data in any form, alternatively) from the remote transmitter (step 200). The receiver's own transmitter then equalizes the outgoing data or generates pre-emphasis for the outgoing data for transmission to the remote receiver based upon the received ratio or equalization data (step 202).

Figure 12:
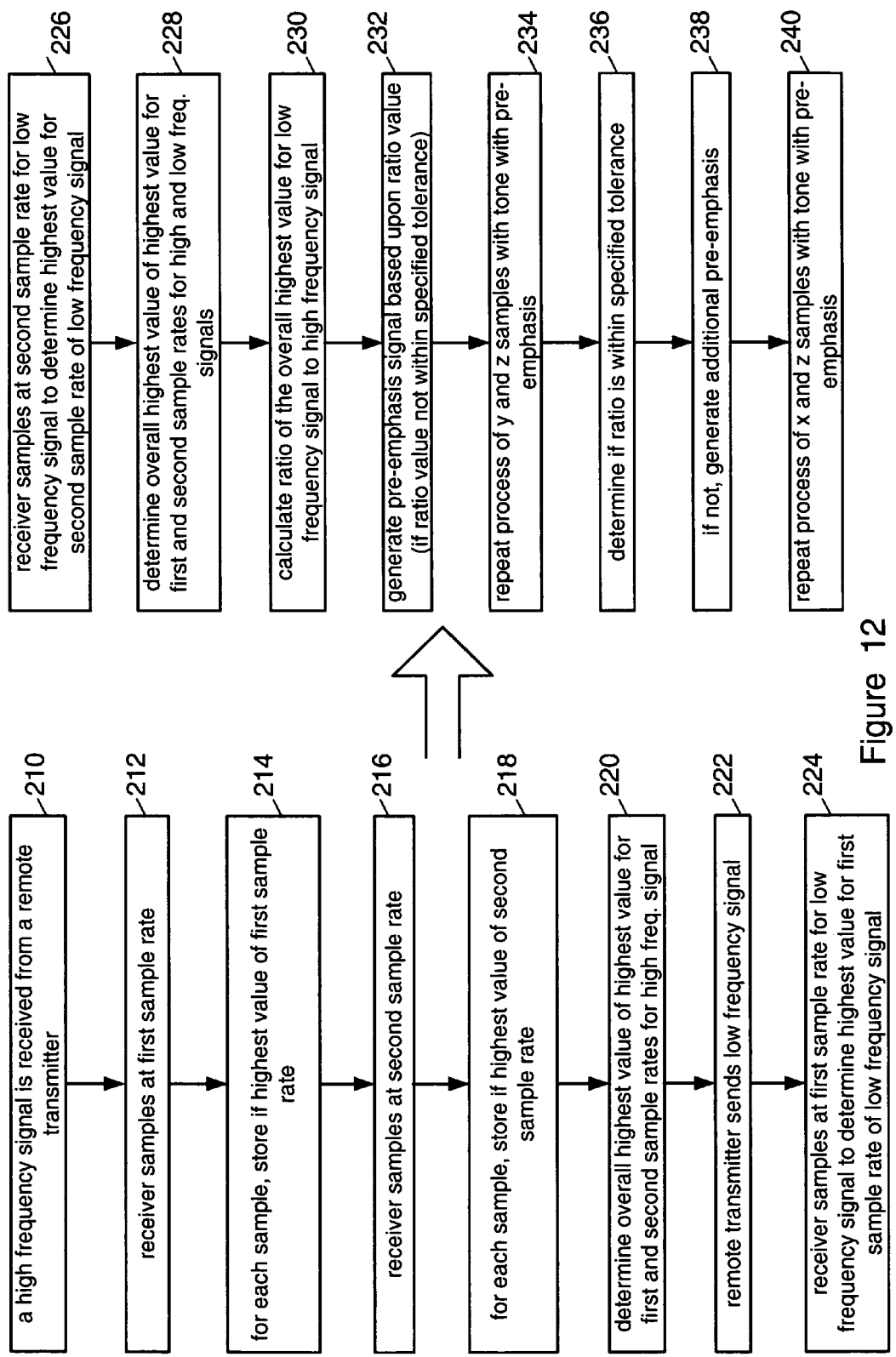
FIG. 12 illustrates a method for equalizing a high data rate serial data stream according to one embodiment of the invention.

FIG. 12 illustrates a method for equalizing a high data rate serial data stream according to one embodiment of the invention. Initially, a high frequency signal is received at a receiver from a remote transmitter (step 210). The receiver then samples the high frequency signal at a first sample rate of y (step 212). For each sample, the receiver stores the sampled value if the sample is the highest value received for the first sample rate y (step 214). This enables the receiver to determine the highest sampled value for the first sample rate y for a high frequency signal. The receiver then samples the high frequency signal at a second sample rate z (step 216).

For each sample taken a sample rate z, the receiver stores the sampled value if the sample is the highest value received for the second sample rate z (step 218). This enables the receiver to determine the highest value for the second sample rate for the high frequency signal. Thus, the receiver then determines the overall highest value of the highest value for the first and second sample rates y and z for the high frequency signal (step 220).

Thereafter, the receiver receives a low frequency signal transmitted by the remote transmitter (step 222). The receiver samples the low frequency signal at a first sample rate w to determine the highest sampled value for the first sample rate of the low frequency signal (step 224). The receiver then samples the low frequency signal at a second sample rate x to determine the highest sampled value for the second sample rate x of the low frequency signal (step 226).

In one embodiment of the invention, the low frequency signal is sampled at only one sample rate if there is a high likelihood that one sample rate is sufficient for determining a peak value. If even the low frequency signal (relatively low in contrast to the high frequency signal) is characterized by a frequency that is sufficiently high, a second sample rate may be used even for the "low" frequency signal to ensure that a peak magnitude be accurately determined (as described here in FIG. 12). This embodiment of the invention then includes the receiver determining an overall highest value of the highest value for the first and second sample rates for the high frequency signal, as well as for the low frequency signal (step 228).

The receiver then calculates a ratio of the overall highest value for the low frequency signal to overall highest value for the high frequency signal (step 230) and generates a pre-emphasis signal based upon the ratio value (if the ratio value is not within specified tolerance) (step 232). The process is then repeated with y and z samples of the high frequency tone that is transmitted with pre-emphasis (step 234). Thereafter, the receiver again determines if a ratio is within the specified tolerance (step 236) and, if not, prompts the transmitter to generate additional pre-emphasis (step 238). Finally, the process is repeated for x and z sample rates with the high frequency tone with additional pre-emphasis (step 240).

Figure 13:
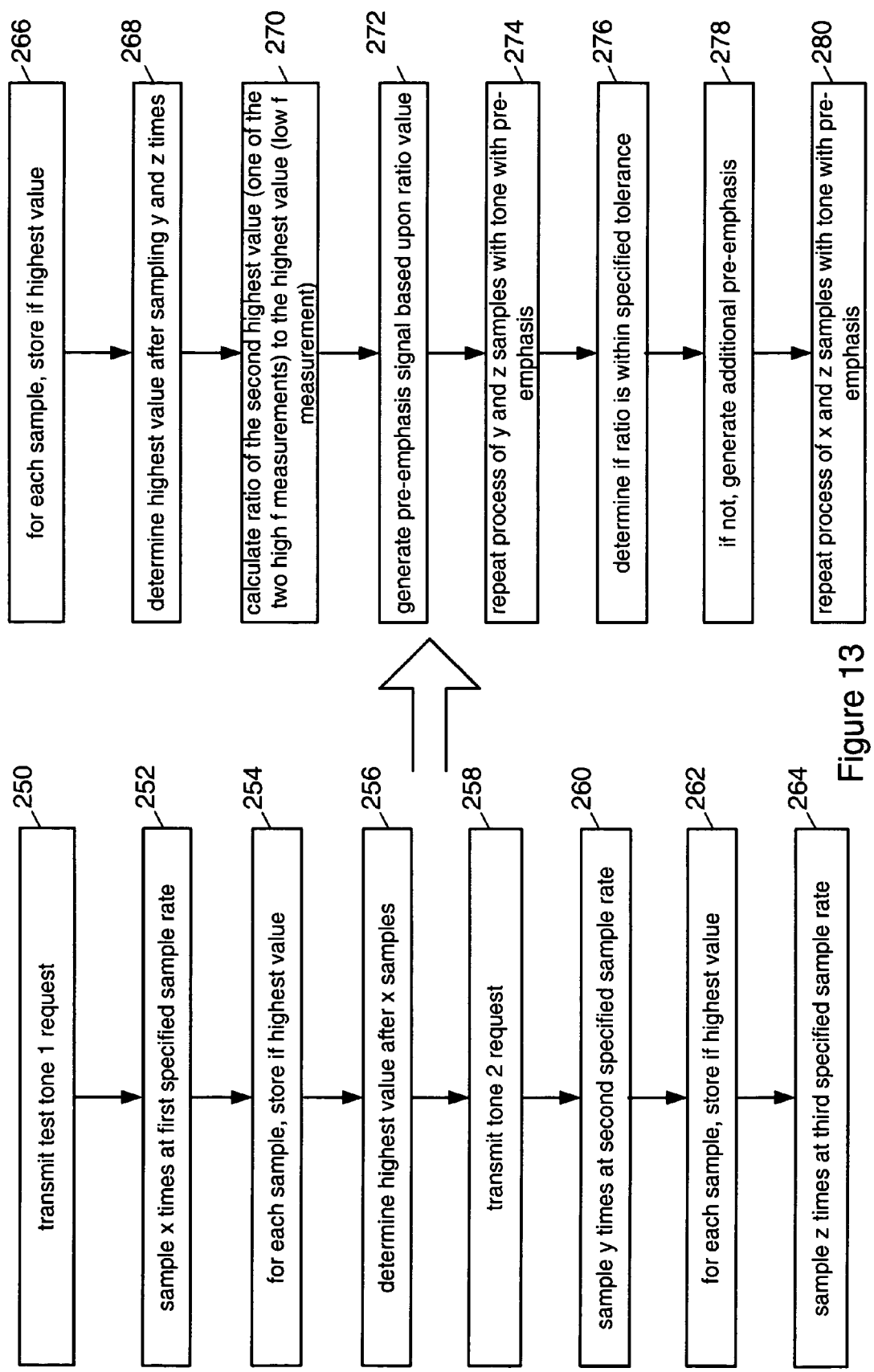
FIG. 13 is a flowchart that illustrates a method for closed loop equalization of high data rate serial data.

FIG. 13 is a flowchart that illustrates a method for closed loop equalization of high data rate serial data. Initially, a transceiver transmits a test tone 1 request (step 250). The test tone that is received in response thereto is sampled at a first specified sample rate of x (step 252). For each sample, the value is stored if it is the highest value received thus far (step 254). Thereafter, the transceiver determines a highest value after a specified number of samples taken at the x sample rate (step 256).

Once the first tone (tone 1) has been sampled, the transceiver transmits a tone 2 request (step 258) and samples a received tone at a second specified sample rate of y (step 260). As before, for each sample, the transceiver stores the sample if it has the highest value thus far (step 262). Tone 2 is then sampled at a third specified sample rate of z (step 264). Again, for each sample, a sample is stored if it has the highest value thus far (step 266).

After sampling the second tone (tone 2) at a y and z sample rate, the invention includes determining a highest value (step 268).

After the samples are taken, this embodiment of the invention includes calculating a ratio of the highest value of tone 1 to the highest value of tone 2 (step 270). In the described example, tone 1 may be a low frequency tone (relatively) and tone 2 may be a high frequency tone.

Finally, this embodiment of the invention includes generating pre-emphasis or otherwise performing equalization (step 272), repeating the process of y and z sample rates with tone 2 with pre-emphasis added (step 274) and determining if the ratio is within tolerance (step 276). If not, the transceiver generates additional pre-emphasis (step 278) and the process of adding pre-emphasis is repeated (step 280).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for equalizing a high-speed serial data stream, comprising:

receiving, at a receiver, a low frequency tone from a transmitter to enable the receiver to determine a first signal level with little to no attenuation;

determining a highest signal magnitude value for x samples of the low frequency tone;
receiving a high frequency tone;
determining a highest signal magnitude value for y samples of the high frequency tone;
determining a ratio of the highest signal magnitude of the low frequency tone to the highest signal magnitude of the high frequency tone;
producing the ratio to a transmitter of a remote transceiver, the transmitter including an equalizer that adds pre-emphasis based upon the ratio;
sampling the high frequency tone at a first and a second specified sample rate for the high frequency tone;
for each sample, determining if the sampled signal has a higher signal magnitude than a previously stored signal magnitude and, if so, storing the signal magnitude value; and
wherein the high frequency tone comprises a frequency that is approximately equal to one half of a specified bit rate of a high bit rate serial data stream.

2. The method of claim 1 wherein the equalizer is within a transmitter that is a part of a transceiver that includes the receiver.

3. The method of claim 1 wherein the equalizer is within a transmitter that is a part of a remote transceiver and wherein the ratio is produced to the transmitter of the remote transceiver wherein the low and high frequency tones were generated by the transmitter of the remote transceiver.

4. The method of claim 3 further comprising determining a highest signal magnitude value for y samples of a high frequency tone with (additional) pre-emphasis signal.

5. The method of claim 1 wherein the steps of calculating and producing the ratio to the transmitter and receiving a tone with added pre-emphasis is repeated until the added pre-emphasis results in the difference in signal magnitudes for the low frequency and the high frequency tones being within tolerance.

6. The method of claim 1 further comprising the receiver generating a request to the remote transceiver for the transmitter to generate the low frequency tone.

7. The method of claim 1 further comprising sampling the low frequency tone x times at a first specified sample rate and then at a second sample rate.

8. The method of claim 2 wherein, for each sample, determining if the sampled signal has a higher signal magnitude than a previously stored signal magnitude and, if so, storing the signal magnitude value.

9. The method of claim 8 further comprising storing the highest signal magnitude value after x samples to indicate a low frequency signal magnitude.

10. The method of claim 1 further including the receiver transmitting a request to the transmitter for the transmitter to generate a high frequency tone.

11. The method of claim 1 further comprising calculating a ratio of the stored signal magnitude from one of the low frequency measurements to the stored signal magnitude value from the high frequency measurement.

12. A method for equalizing a high-speed serial data stream, comprising:
receiving a low frequency tone to determine a first signal level with little to no attenuation;
determining a highest signal magnitude value for x samples of the low frequency tone;
receiving a high frequency tone;
determining a highest signal magnitude value for y samples of the high frequency tone;
adding pre-emphasis to equalize a signal based on a difference in low frequency and high frequency signal magnitudes if the difference is not within tolerance;
determining a highest signal magnitude value for y samples of the high frequency tone with additional-pre-emphasis signal;
calculating a ratio between the signal magnitudes for the high and low frequency tones;
transmitting a request to the transmitter for the transmitter to generate a first tone which first tone is a low frequency tone;
sampling the first tone x times at a first specified sample rate;
determining if the sampled signal has a higher signal magnitude than a previously stored signal magnitude and, if so, storing the signal magnitude value;
storing the highest signal magnitude value after x samples to indicate a low frequency signal magnitude;
transmitting a request to the transmitter for the transmitter to generate a second tone which second tone is a high frequency tone;
sampling the second tone y times at a second specified sample rate;
for each sample, determining if the sampled signal has a higher signal magnitude than a previously stored signal magnitude and, if so, storing the signal magnitude value;
storing the highest signal magnitude value after y samples to indicate a first high frequency signal magnitude;
wherein the second tone comprises a frequency that is approximately equal to or greater than one half of a specified bit rate of a high bit rate serial data stream;
sampling the second tone z times at a specified third sample rate;
for each sample, determining if the sampled signal has a higher signal magnitude than a previously stored signal magnitude and, if so, storing the signal magnitude value;
storing the highest signal magnitude value after z samples to indicate a second high frequency signal magnitude;
determining a highest value after sampling y and z times;
calculating a ratio of the second highest signal magnitude value from one of the two high frequency measurements to the highest signal magnitude value from the low frequency measurement; and
generating a high frequency tone with pre-emphasis based upon a value of the calculated ratio.

13. The method of claim 12 further including sampling the high frequency tone with pre-emphasis.

14. The method of claim 13 further including calculating a ratio of a signal magnitude for the high frequency signal with pre-emphasis to the signal magnitude of the low frequency signal.

15. The method of claim 14 further including determining if the ratio is within specified tolerance.

16. The method of claim 15 further including adding additional pre-emphasis if the ratio is not within tolerance.

17. The method of claim 16 further including adding pre-emphasis until the ratio is within tolerance.

18. Programmable fabric, comprising:
transmitter module for generating high-speed serial data;
receiver module for receiving high-speed serial data from an external transmitter, the receiver module further comprising:
sample and hold module coupled to received the high-speed serial data and coupled to receive a sample control signal wherein the sample and hold module samples a received signal when the sample control signal is asserted and produces a sampled signal;

analog-to-digital converter coupled to receive the sampled signal, the analog-to-digital converter for producing a digital value reflecting a signal magnitude of the sampled signal; and equalization logic for producing equalization data based upon a plurality of digital values produced by the analog-to-digital converter wherein the equalization data is produced to an external transmitter to prompt the external transmitter to equalize the high-speed serial data, wherein the equalization logic further comprises logic to select a divisor value for dividing a reference oscillation to produce the sample control signal and the equalization logic selects a first divisor value for creatin a low frequency tone sample rate.

19. The programmable fabric of claim 18 wherein the equalization logic selects a second divisor value for creating a first high frequency tone sample rate.

20. The programmable fabric of claim 19 wherein the equalization logic selects a third divisor value for a second high frequency tone sample rate.

21. The programmable fabric of claim 18 wherein the equalization logic generates a request to the external transmitter for the transmitter to generate one of a first or second high frequency tones.

22. A receiver for receiving high-speed serial data from an external transmitter, comprising:

sample and hold module coupled to received the high-speed serial data and coupled to receive a sample control signal wherein the sample and hold module samples a received signal when the sample control signal is asserted and produces a sampled signal;

analog-to-digital converter coupled to receive the sampled signal, the analog-to-digital converter for producing a digital value reflecting a signal magnitude of the sampled signal; and equalization logic for producing equalization data based upon a plurality of digital values produced by the analog-to-digital converter wherein the equalization data is produced to an external transmitter to prompt the external transmitter to equalize the high-speed serial data, wherein the equalization logic further comprises logic to select a divisor value for dividing a reference oscillation to produce the sample control signal, and the equalization logic selects a first divisor value for creating a low frequency tone sample rate.

23. The receiver of claim 22 wherein the equalization logic selects a second divisor value for creating a first high frequency tone sample rate.

24. The receiver of claim 23 wherein the equalization logic selects a third divisor value for a second high frequency tone sample rate.

25. The receiver of claim 22 wherein the equalization logic generates a request to the external transmitter for the transmitter to generate one of a first or second high frequency tones.

* * * * *